(No Model.)
W. ROTHWELL.
STRAIGHT KNITTING MACHINE.
No. 358,167.　　　　　Patented Feb. 22, 1887.
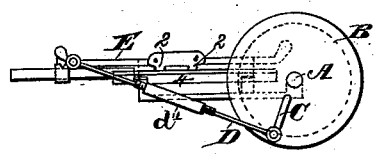
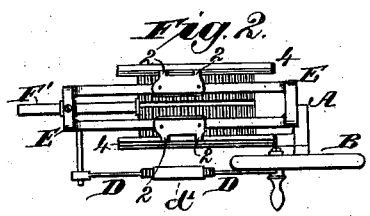
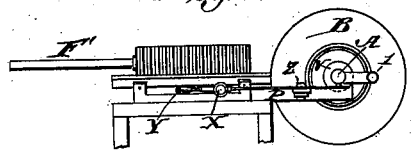
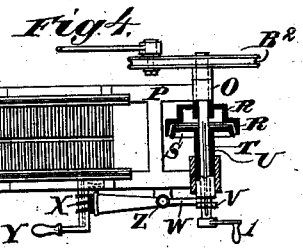
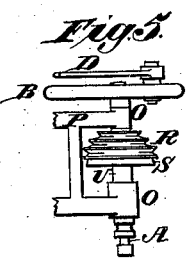
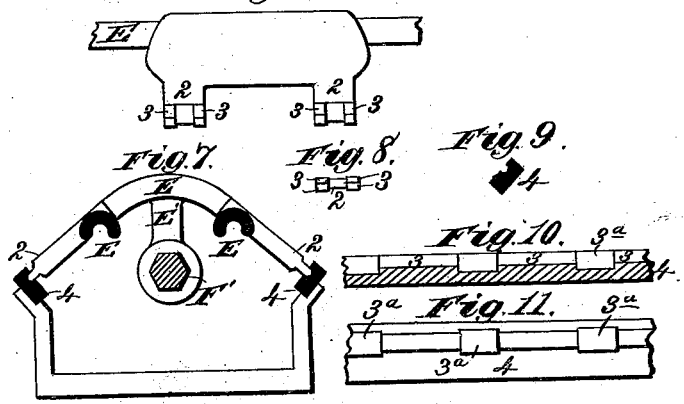
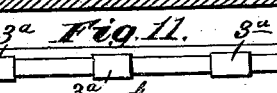
Witnesses.
Robt Everett.
Percy B. Hills.
Inventor
William Rothwell.
By James L. Norris
Atty.
N. PETERS, Photo-Lithographer, Washington, D. C.

UNITED STATES PATENT OFFICE.

WILLIAM ROTHWELL, OF BOLTON, COUNTY OF LANCASTER, ENGLAND.

STRAIGHT-KNITTING MACHINE.

SPECIFICATION forming part of Letters Patent No. 358,167, dated February 22, 1887.

Application filed September 3, 1886. Serial No. 212,617. (No model.) Patented in England June 4, 1884, No. 8,570.

*To all whom it may concern:*

Be it known that I, WILLIAM ROTHWELL, residing at Nos. 1, 3, and 5 Market Street, Bolton, in the county of Lancaster, England, have invented new and useful Improvements in Straight-Knitting Machines, of which the following is a specification.

My invention relates to improvements in machines for knitting Cardigan jackets, jerseys, vests, shawls, skirts, stockings, socks, and other articles of hosiery; and it consists in improved means for working the same and for varying the travel of the carriage according to the width of the articles being knitted; also, in reducing the frictional sliding parts to a minimum, with the result that the machine can be run or worked at a much greater speed than hitherto with a corresponding increase in the production.

In order that my said invention may be fully understood and readily carried into operation, I will now proceed to describe the annexed sheet of drawings, reference being made to the figures and letters marked thereon.

As shown in Figures 1 and 2, on the crank or driving shaft A is mounted the balanced or other fly-wheel, B, provided with the slot C, in which the end of the connecting-rod D is secured, and by which the carriage E is operated from the fly-wheel B, said rod D being adjustable in length by means of a turn-buckle, d'. The slot C is provided for the purpose of regulating the stroke or travel of the carriage E, according to the width of the articles being knitted.

The fly-wheel B and rod D can be placed on the front side of the machine, as in Figs. 1 and 2, or otherwise, as in Figs. 3, 4, and 5.

In arranging the hand-machine to work by power with a strap from any suitable gearing above or below the same, the crank-shaft A is arranged, as in Fig. 4, being mounted in the bearings O, secured to the bed P of the machine. The strap-pulley R is mounted loosely on the shaft A and turned on the inside to form a friction-clutch, in which slides the friction-disk S, the latter being driven by the float key or feather T in the shaft A, by which the machine is driven. If desired or necessary, the friction-disk S is covered with leather or other analogous substance to increase the frictional power of the clutch. The friction-disk S is provided with the sleeve or boss U, which extends through the boss or bearing O, the outer end being grooved to admit the pin V, secured to the end of the sector-lever W, the latter being moved by the worm X on turning the handle Y. The sector W is pivoted on the center Z, secured or attached to the bed of the machine.

When it is desired to work the machine, the handle Y is turned by the attendant, with the result that the friction-disk S is pressed into the clutch inside the loose pulley R, and by which the machine is operated by the strap driving onto the pulley R. In case the machine is required to be stopped, it is performed by simply reversing the action of the handle Y, when it can be turned or operated by hand by the handle 1 on the end of the shaft A, during which the loose pulley R is revolving by the action of the driving-strap. If desired, the strap-pulleys can be replaced by band-pulleys, as in Fig. 5.

For the purpose of giving stability to the carriage of the machine and reducing the friction of the sliding parts to a minimum, the carriage E is fitted with the slide blocks or feet 2, mounted in the parallel slides 4, which are constructed, as shown in Figs. 6, 7, and 8, in which case the bottom ends are $V'^a$ or tapered or semicircular to fit the correspondingly-shaped slide-bearing 4. (Shown in Fig. 9.)

The bottom and sides of the feet 2 are constructed with the raised bearing or wearing surfaces 3, as in Figs. 6 and 8, for the purpose of reducing the frictional surface, as well as that of forming an oil-cavity between each, which is also performed in the parallel slides 4, as in Figs. 10 and 11, which allows the slide-blocks to move from end to end without displacing the lubricant. In other words, the slideways or grooves in the parallel slides 4 are provided at suitable intervals with pockets or cavities $3^a$, which will retain the oil and over which the feet 2 pass, giving to the latter just sufficient contact to insure lubrication.

To insure stability on the end of the carriage to which the connecting-rod D is attached, the carriage E is provided with the arm E', which slides on the polygonal rod or stay F', which may be constructed of any convenient section, such as those shown in Figs. 12 to 15, inclusive. The rod or stay F' is secured by any convenient means to the needle-bed of the machine.

Having now particularly described and ascertained the nature of my said invention, and in what manner the same is to be performed, I declare that what I claim is—

1. In a knitting-machine, the combination, with the shaft A, of the fly or crank wheel B, having a slot, C, the rod D, adjustable in length by a turn-buckle, the carriage E, having feet 2, each formed with wearing-points 3, separated by an intermediate space, and the slides 4, having ways which guide the feet, substantially as described.

2. The combination of the shaft A, crank-wheel B, carriage E, rod D, connecting said wheel and carriage, cone clutch-box R, mounted loosely on shaft A, friction-disk S, sliding on said shaft, worm-shaft X, and sector-lever W, fulcrumed between its ends and engaged at one end with the worm-shaft and at the other end with shaft A, substantially as described.

3. The combination, with the slides 4, having ways formed therein, of the carriage E, having feet 2, provided with wearing-points 3, which rest in the ways in the slides, space being left between the points to form an oil-chamber, substantially as described.

4. The combination, with the slides 4, having parallel ways formed therein and provided with recesses or pockets $3^x$, of the carriage E, having feet 2, each formed with wearing-points 3, separated by an intermediate space, substantially as described.

5. The combination, with the carriage E, having the arm E', of the stay F', having in cross-section substantially a polygonal shape, as specified.

In witness whereof I, the said WILLIAM ROTHWELL, have hereunto set my hand and seal this 6th day of August, A. D. 1886.

WILLIAM ROTHWELL. [L. S.]

Witnesses:
   JOHN BRYNING HARPER,
   EDMUND CHADWICK.